(12) United States Patent
Plotsker

(10) Patent No.: US 9,080,838 B2
(45) Date of Patent: Jul. 14, 2015

(54) ACTIVE DISPLAY BASED TARGETING AND WEAPON SITING SYSTEM

(75) Inventor: Vadim Plotsker, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 187 days.

(21) Appl. No.: 13/825,358

(22) PCT Filed: Jul. 19, 2012

(86) PCT No.: PCT/US2012/047270
§ 371 (c)(1),
(2), (4) Date: Mar. 21, 2013

(87) PCT Pub. No.: WO2013/012970
PCT Pub. Date: Jan. 24, 2013

(65) Prior Publication Data
US 2013/0180153 A1  Jul. 18, 2013

Related U.S. Application Data

(60) Provisional application No. 61/510,100, filed on Jul. 21, 2011.

(51) Int. Cl.
| G02B 23/00 | (2006.01) |
| F41G 1/30 | (2006.01) |
| F41G 1/34 | (2006.01) |
| F41G 1/473 | (2006.01) |
| G02B 23/04 | (2006.01) |
| G02B 27/01 | (2006.01) |
| F41G 1/00 | (2006.01) |

(52) U.S. Cl.
CPC .. *F41G 1/30* (2013.01); *F41G 1/00* (2013.01); *F41G 1/345* (2013.01); *F41G 1/473* (2013.01); *G02B 23/04* (2013.01); *G02B 27/0101* (2013.01); *G02B 27/0189* (2013.01)

(58) Field of Classification Search
USPC ............ 42/111, 113, 119, 130; 359/629, 630, 359/638
See application file for complete search history.

(56) References Cited

U.S. PATENT DOCUMENTS

| 5,355,224 A | 10/1994 | Wallace |
| 5,892,617 A | 4/1999 | Wallace |
| 6,111,692 A | 8/2000 | Sauter |
| 6,123,006 A | 9/2000 | Bedford, Jr. et al. |
| 2006/0048432 A1 | 3/2006 | Staley, III |
| 2007/0109638 A1 | 5/2007 | Tai |

*Primary Examiner* — John W Eldred
(74) *Attorney, Agent, or Firm* — Prakash Nama; Daniel J. Long

(57) ABSTRACT

An active display based targeting and weapon siting system for providing focusing and targeting data is disclosed. In one embodiment, the active display based targeting and weapon siting system includes an angled optic device configured to allow a user's line of sight to pass through the angled optic device. Further, the active display based targeting and weapon siting system includes a display module configured to provide images including video images, multicolor images and/or wide boresight adjustment and to direct the images into the user's line of sight through the angled optic device.

10 Claims, 3 Drawing Sheets

ACTIVE DISPLAY BASED TARGETING AND WEAPON SITING SYSTEM

CROSS-REFERENCE TO RELATED APPLICATIONS

This Application claims rights under 35 USC §119(e) from U.S. Application 61/510,100 filed Jul. 21, 2011, the contents of which are incorporated herein by reference.

BACKGROUND OF THE INVENTION

1. Field of the Invention

The present invention relates to a targeting and weapon siting system, more specifically to an active display based targeting and weapon siting system.

2. Brief Description of Related Art

Targeting and weapon siting systems are used in many applications and more particularly useful for weapons and military applications. Existing boresight and targeting systems deploy simple red dot or holographic devices for siting onto a target. These approaches do not aid a user to acquire the target as there are other factors that the user has to gauge before taking a shot at the target. Further, these approaches do not allow for video insertion, multi-color image insertion, and/or wide boresight adjustment.

SUMMARY OF THE INVENTION

An active display based targeting and weapon siting system is disclosed. According to one aspect of the present subject matter, the active display based targeting and weapon siting system includes an angled optic device and a display module. In operation, the angled optic device is configured to allow a user's line of sight to pass through the angled optic device. Further, the display module provides images including video images, multi-color images and/or wide boresight adjustment and directs the images into the user's line of sight through the angled optic device.

According to another aspect of the present subject matter, the active display based targeting and weapon siting system includes the angled optic device and the display module. Further, the display module includes a mirror and at least one focusing lens. In operation, the angled optic device is configured to allow the user's line of sight to pass through the angled optic device. Further, the display module provides the images including video images, multi-color images and/or wide boresight adjustment. Further, the at least one focusing lens is configured to focus the images from the display module on to the mirror. Furthermore, the mirror is configured to reflect the images on to the user's line of sight through the angled optic device.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

Figure 1:
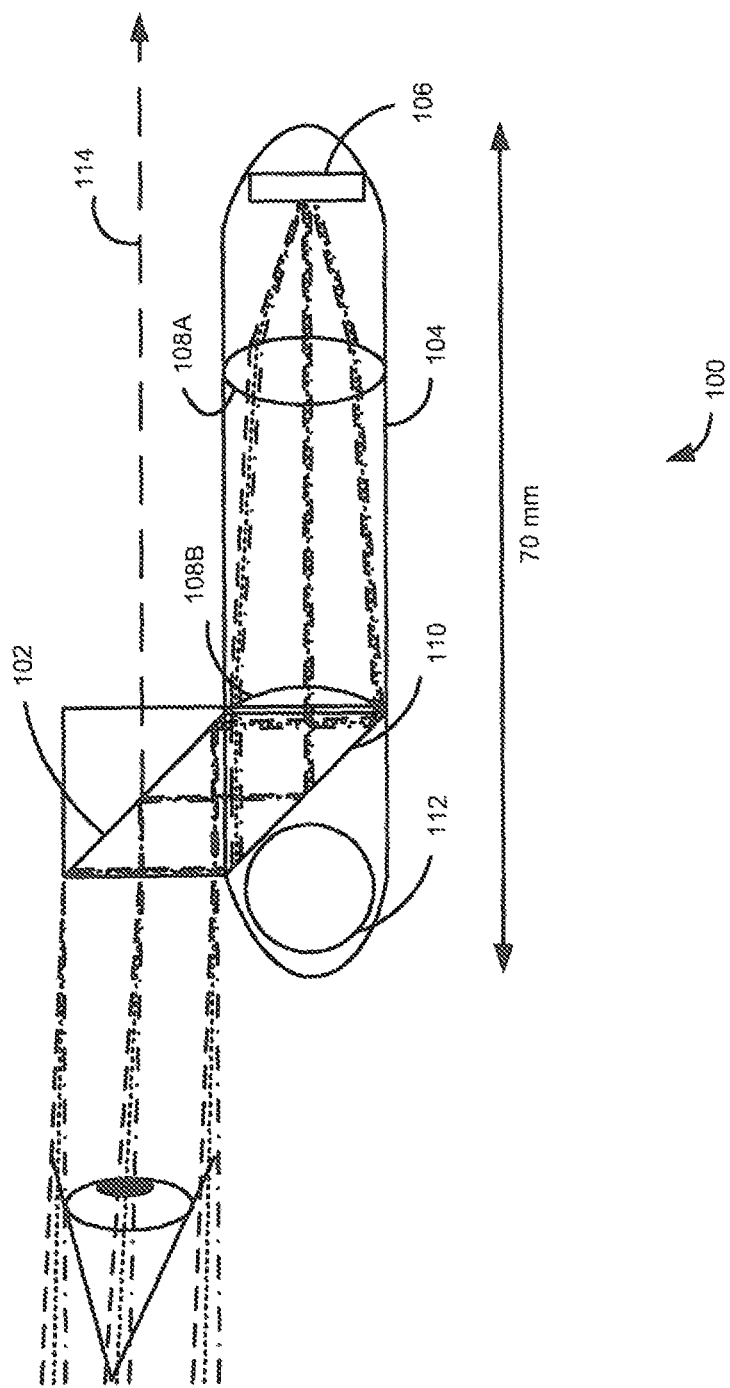
FIG. 1 illustrates a block diagram of an active display based targeting and weapon siting system, according to an embodiment of the present subject matter.

FIG. 1 illustrates a block diagram 100 of an active display based targeting and weapon siting system, according to an embodiment of the present subject matter. As shown in FIG. 1, the active display based targeting and weapon siting system includes an angled optic device 102 and a display module 104. For example, the angled optic device 102 includes a transparent prism or a transparent partially reflective material. Further, the display module 104 includes a video display 106, focusing lenses 108A and 108B, a mirror 110 and a power source 112. The display module 104 has a length of approximately 70 millimeter (mm). For example, the power source 112, such as a battery and the like provides power to the display module 104. Exemplary video display 106 includes a video micro display, a light emitting diode (LED) display, a liquid crystal display (LCD), an active matrix liquid crystal display (AMLCD), an organic light emitting diode (OLED) and the like.

In operation, the angled optic device 102 is configured to allow a user's line of sight 114 to pass through the angled optic device 102. The user's line of sight 114 is in a left to right direction. Further, the display module 104 provides images including video images, multi-color images and/or wide boresight adjustment and directs the images into the user's line of sight 114 through the angled optic device 102. In one embodiment, the video display 106 provides the images including the video images, multi-color images and/or wide boresight adjustment. In one exemplary implementation, the images provided by the video display 106 include focusing and targeting data, such as co-ordinates of a target, a distance between a user and the target and the like required by the user for acquiring the target. Further, at least one of the focusing lenses 108A and 108B is configured to focus the images from the video display 106 on to the mirror 110. Exemplary mirror 110 includes a slanted mirror, a curved mirror and the like. Furthermore, the mirror 110 is configured to reflect the images on to the user's line of sight 114 through the angled optic device 102. Moreover, when the user sees through the angled optic device 102, the images from the video display 106 are visible in the user's line of sight 114. This is explained in more detail with reference to FIG. 3B.

Figure 2:
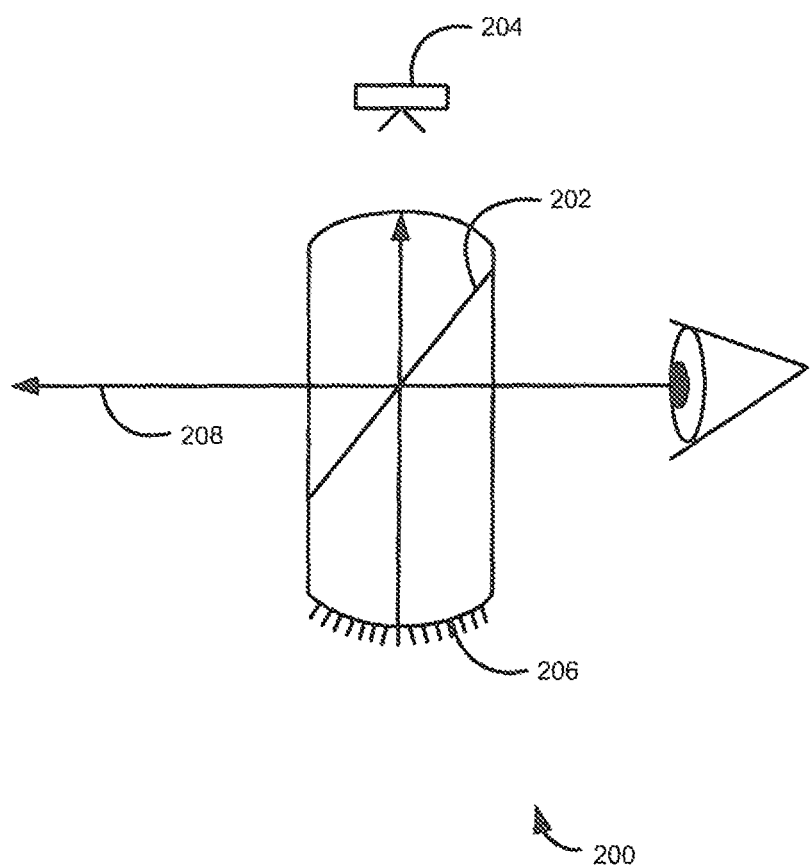
FIG. 2 is another block diagram of the active display based targeting and weapon siting system, according to an embodiment of the present subject matter.

Referring now to FIG. 2, which illustrates another block diagram 200 of the active display based targeting and weapon siting system, according to an embodiment of the present subject matter. As shown in FIG. 2, the active display based targeting and weapon siting system includes an angled optic device 202, a video display 204, and a curved mirror 206. Further, the video display 204 is positioned above the angled optic device 202. Furthermore, the curved mirror 206 is positioned below the angled optic device 202.

In operation, the angled optic device 202 is configured to allow a user's line of sight 208 to pass through the angled optic device 202. The user's line of sight 208 is in a right to left direction. Further, the video display 204 projects images including video images, multi-color images and/or wide boresight adjustment. Furthermore, the images projected by the video display 204 pass through the angled optic device 202 and reflect off from the curved mirror 206. In addition, the images reflected from the curved mirror 206 reflect off from the angled optic device 202 and continue on to the user's eye. For example, the angled optic device 202 is transparent enough to not block the user's line of sight 208 and also reflective enough to make the images from the video display 204 visible to the user. Moreover, when the user sees through the angled optic device 202, the images from the video display 204 are visible in the user's line of sight 208. This is explained in more detail with reference to FIG. 3B.

Figure 3A:
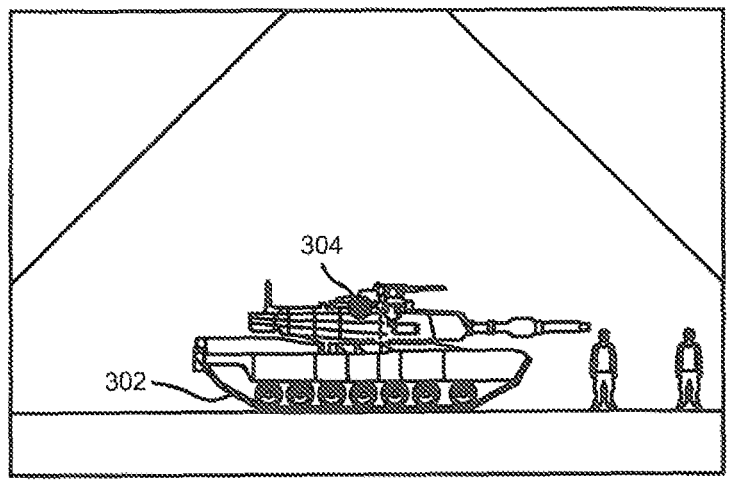
FIG. 3A illustrates a view of an image of a standard weapon siting system, in the context of the present subject matter.

Referring now to FIG. 3A, which illustrates a view of an image 300A of a standard weapon siting system, in the context of the present subject matter. As shown in FIG. 3A, the image 300A includes a target 302 the user is focusing on and a dot 304 that is visible in the user's line of sight. In operation, to acquire the target 302, the user needs to calculate the focusing and targeting data using the dot 304.

Figure 3B:
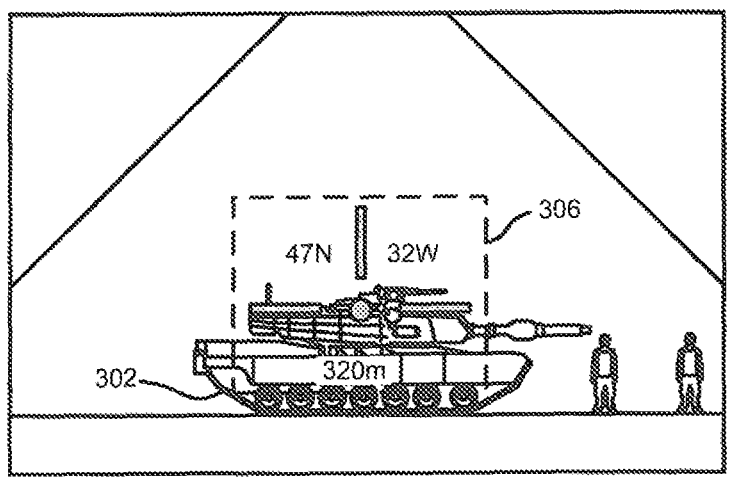
FIG. 3B illustrates a view of an image of the active display based targeting and weapon siting system, according to an embodiment of the present subject matter.

Referring now to FIG. 3B, which illustrates a view of an image 300B of the active display based targeting and weapon siting system, according to an embodiment of the present subject matter. As show in FIG. 3B, the image 300B includes the target 302 and focusing and targeting data 306, from the video display, that is visible in the user's line of sight. Further, the focusing and targeting data 306 includes coordinates of the target 302 (47N, 32W) and a distance between the target 302 and the user (320 meters). The focusing and targeting data 306 displayed by the active display based targeting and weapon siting system assists the user to take a better aim at the target 302 and improves strike rate of the user.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An active display based targeting and weapon siting system comprising:
    an angled optic device configured to allow a user's line of sight to pass through the angled optic device; and
    a display module configured to provide video images or multi-color images along with focusing and targeting data and to direct the video mages or multi-color images along with the focusing and targeting data into the user's line of sight through the angled optic device.

2. The active display based targeting and weapon siting system of claim 1, wherein the angled optic device is a transparent prism or a transparent partially reflective material.

3. The active display based targeting and weapon siting system of claim 1, wherein the display module comprises a video display that is selected from the group consisting of a video micro display, a light emitting diode (LED) display, a liquid crystal display (LCD), an active matrix liquid crystal display (AMLCD) and an organic light emitting diode (OLED).

4. The active display based targeting and weapon siting system of claim 1, wherein the display module comprises:
    a mirror; and
    at least one focusing lens configured to focus the video images or multi-color images along with the focusing and targeting data from the display module on to the mirror and wherein the mirror is configured to reflect the video images or multi-color images along with the focusing and targeting data on to the user's line of sight.

5. The active display based targeting and weapon siting system of claim 4, wherein the display module further comprises a power source to provide power to the display module.

6. The active display based targeting and weapon siting system of claim 5, Wherein the power source is a battery.

7. The active display based targeting and weapon siting system of claim 4, wherein the mirror is a slanted mirror or a curved mirror.

8. An active display based targeting and weapon siting system, comprising:
    an angled optic device configured to allow a user's line of sight to pass through the angled optic device; and
    a display nodule, wherein the display module comprises:
    a mirror; and
    at least one focusing lens, wherein the display module is configured to provide video images or multi-color images along with focusing and targeting data, wherein the at least one focusing lens is configured to focus the video images or multi-color images along with the focusing and targeting data from the display module on to the mirror and wherein the mirror is configured to reflect the video images or multi-color images along with the focusing and targeting data on to the user's line of sight through the angled optic device.

9. The active display based targeting and weapon siting system of claim 8, wherein the mirror is a slanted mirror or a curved mirror.

10. The active display based targeting and weapon siting system of claim 8, wherein the angled optic device is a transparent prism or a transparent partially reflective material.

* * * * *